Figure 1:
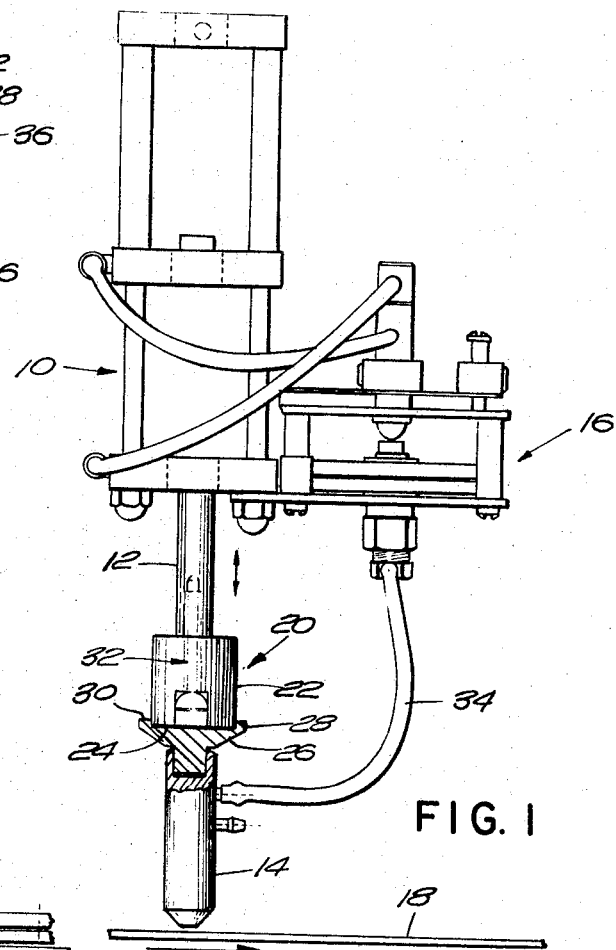

Sept. 5, 1967 R. D. BOND 3,339,845
BREAKAWAY CONNECTION
Filed Dec. 20, 1965

INVENTOR.
ROBERT D. BOND
BY
Morse, Altman & Oates
ATTORNEYS

United States Patent Office 3,339,845
Patented Sept. 5, 1967

3,339,845
BREAKAWAY CONNECTION
Robert D. Bond, Waltham, Mass., assignor to B. C. Ames Company, Waltham, Mass., a corporation of Massachusetts
Filed Dec. 20, 1965, Ser. No. 515,069
1 Claim. (Cl. 239—283)

This invention relates generally to a breakaway connection for protecting delicate instruments. More particularly this invention is directed towards a magnetic breakaway coupling for an instrument actuating member permitting the member or a portion thereof to deflect or break loose when accidentally struck whereby the force of the blow will not be transmitted to the instrument.

Numerous types of instruments such as dial indicators and web followers for gauging webs, for example, employ elongated members in the form of probes, rods nozzles or the like which extend out from the instrument and are operatively connected thereto. Such instruments usually are of precision construction and are subject to damage by accidental blows to the probe, follower or other actuating member. For example, a web follower may have an air jet nozzle disposed adjacent to the face of a moving web with the web thickness being operative to reciprocate a rod and piston in response to changes in web thickness. Should a fold in the web, thick wrinkle or loose object carry against the follower, the entire unit may be damaged because of transmitted shock. Similarly, with the probe for a dial indicator being held against a moving work piece, a sharp irregularity in the engaged surface would strike against the probe tip possibly bending the probe and damaging the gauge movement. In any event, such blows to the instrument actuating member may so damage the unit as to require its repair or replacement.

It is an object of the present invention to provide means for protecting an instrument from damage by sudden blows to its actuating member.

Another object of this invention is to provide a novel breakaway coupling between an instrument and its actuating member.

More particularly, this invention features a breakaway coupling for an instrument actuating device, comprising a pair of magnetically co-acting self-seating members, one of which is mounted on a portion of an actuating component directly connected to the instrument and the other mounted on an end portion thereof whereby the end portion will be held detachably connected and adapted to deflect or release from the fixed portion by an accidental blow. The detachable end portion may be connected to the instrument by a flexible keeper to prevent its being carried away after being knocked loose.

Figure 3:
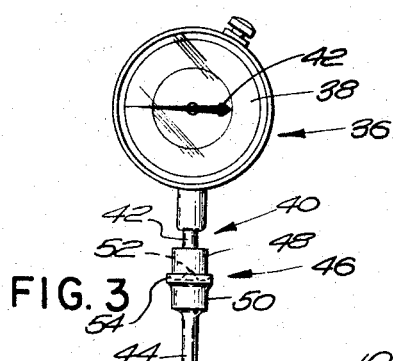
Figure 4:
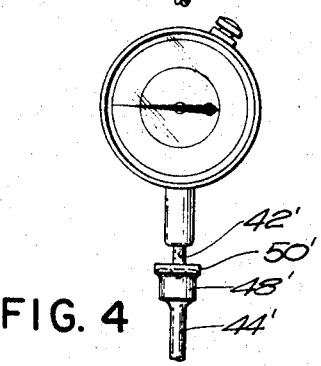
Figure 2:
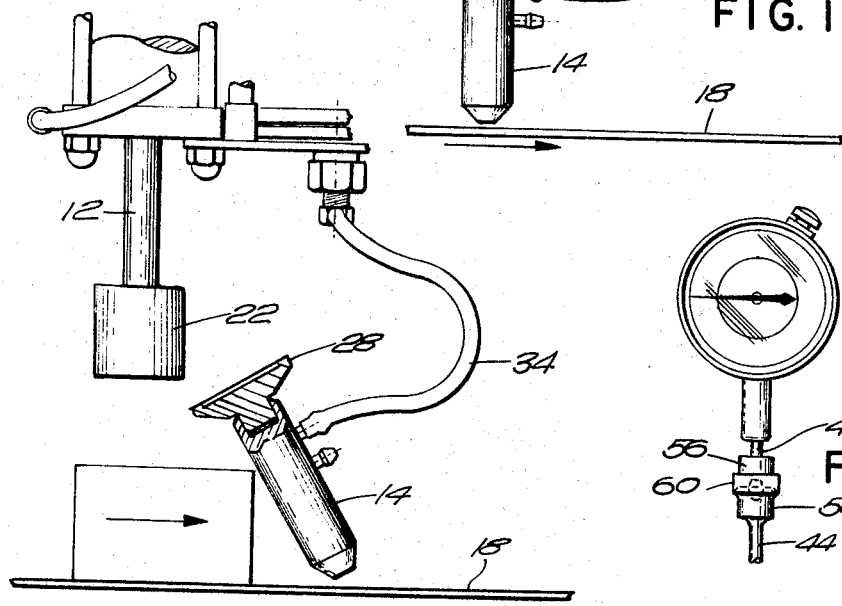
Figure 5:
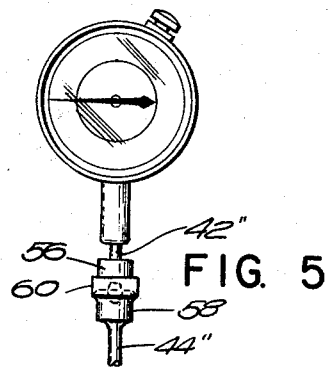

However, these and other features of the invention, along with further objects and advantages thereof, will become more readily apparent from the following detailed description of preferred embodiments of the invention, with reference being made to the accompanying drawings in which:

FIG. 1 is a view in side elevation partly in section of a follower with a magnetic breakaway coupling made according to the invention, FIG. 2 is a fragmentary view similar to FIG. 1 showing the follower knocked out of position, FIG. 3 is a front elevation showing the invention in use with a dial indicator, and FIGS. 4 and 5 are views similar to FIG. 3 but showing modification of the invention.

Referring now to the drawings and in particular to FIG. 1, there is shown a web follower of the sort disclosed in U.S. Patent No. 2,692,498 comprising a pneumatic cylinder 10 having a piston rod 12, an air nozzle 14 and a pressure amplifier 16. The nozzle 14 is adapted to direct a jet of air against the face of a web 18 so as to maintain a constant distance between the nozzle and the web surface. The device operates by the development of work-reflected backpressure whereby any variation in the thickness of the web will produce a pressure imbalance in the cylinder 10 causing the piston rod and nozzle to move to or away from the web as the web decreases or increases in thickness. In practice, the instrument is mounted above the surface of the moving web and may traverse the width of the web to monitor its thickness throughout. Insofar as the nozzle tip follows quite closely to the face of the web, it is subject to damage should it be in the path of a heavy object accidentally carried along by the web or should a sharp fold or crease occur in the web to form an unusually sharp thickness therein.

In FIG. 1, a magnetic coupling 20 is provided between the lower end of the piston rod and the upper end of the air nozzle 14. The coupling includes a cylindrical magnet 22, having flat pole faces 24 and 26, secured to the lower end of the rod 12 with the pole faces oriented downwardly.

The coupling also includes an adapter 28 of magnetically responsive material, such as soft iron or the like, which is fastened to the upper end of the nozzle 14. Preferably, the adapter 28 is circular in cross section as is the magnet 22. The adapter is formed with an annular inclined shoulder 30 about an upwardly facing flat circular face 32 whereby the flat pole faces of the magnet may seat flat against the center face of the adapter and the inclined walls of the annular shoulder will precisely position the adapter with respect to the magnet. In this fashion the nozzle 14 will be in precise axial alignment with the rod 12 when the adapter is seated against the magnet.

The arrangement is such that the nozzle 14 will be held firmly in place against the rod 12 and during normal operation the nozzle 14 and rod 12 will move in unison with respect to the web and to the cylinder. However, as suggested in FIG. 2, in the event that the nozzle should be struck accidentally from any side either by an operator, maintenance man, or spurious object carried by the web, the nozzle section and its adapter will be deflected or knocked entirely loose from the magnet and the rod 12, according to the force and character of the blow, thereby preventing damage to the rod or to the remaining portion of the instrument. The nozzle may be readily replaced by merely positioning it against the magnet which will again hold it firmly in precise axial alignment for normal operation. A slight blow to the nozzle normally will only deflect the nozzle temporarily and the nozzle will in most instances re-seat itself automatically.

In the FIG. 1 embodiment a keeper line 34 is provided between the nozzle 14 and the pressure amplifier 16. The keeper in this instrument is a flexible tube which also functions as an air conduit between the nozzle and the amplifier and also keeps the nozzle in easy reach should it be knocked loose from the supporting magnet. It will be understood that otherwise the nozzle may be carried along by the moving web if knocked loose and the keeper prevents loss or damage to the nozzle.

Referring more particularly now to FIGS. 3, 4 and 5 there is shown a breakaway magnetic coupling embodied in a dial indicator 36. In FIG. 3 the indicator is provided with the usual dial 38 and elongated probe 40 which actuates a needle 42 upon reciprocation of the probe in response to changes in dimensions of the gauged work.

In FIG. 3 the probe 40 is formed into upper and lower sections 42 and 44 respectively with the two sections being connected by a magnetic coupling 46. As in the principal embodiment, the upper section 42 is secured to a permanent magnet 48 of circular cross-section and the lower section 44 is formed with or secured to an adapter 50 of magnetically responsive material. As before the adapter is formed with a flat circular face 52 and a surrounding annular shoulder 54 for precisely positioning the probe end 44 in relation to the probe section 42. With this arrangement the probe tip 44 will separate from the probe section 42 should the probe tip be struck accidentally from any side. This will avoid damage to the instrument particularly its internal movements.

In the FIG. 4 embodiment the magnetic coupling elements have been reversed with the magnet 48' being secured to the detachable probe tip 44' and the magnetically reactive adapter 50' being mounted to the probe section 42'. In FIG. 5 there is shown a magnetic coupling 46" joining probe sections 42" and 44" and comprising a pair of magnets 56 and 58 in face to face engagement. The upper magnet 56 will be seen to be formed with an annular shoulder 60 serving to align precisely the magnets when coupled in operating position. As with the principal embodiment a flexible keeper may be employed between the detachable probe tip and a fixed portion of the indicator.

By making the magnets and adapters circular in cross-section a blow to any side or from any angle against the detachable portion of the probe, follower or the like, will cause separation of the coupling. Accidental light strokes against the tip may cause a temporary displacement of the parts without total separation. The flat faces provided between the coupling members and the use of a tapered annular shoulder insures precise positioning between the elements and also facilitates positioning of the parts when being brought together after separation.

While the invention has been described with particular reference to the illustrated embodiments, it will be understood that numerous modifications thereto will appear to those skilled in the art. For example, the magnetic coupling may be employed with numerous types of instruments other than those shown. Accordingly, the above description and accompanying drawings should be taken as illustrative of the invention and not in a limiting sense.

Having thus described the invention, what I claim and desire to obtain by Letters Patent of the United States is:

A breakaway coupling for mounting a nozzle on an air follower, comprising (a) a piston rod operatively connected to said follower, (b) a tubular air nozzle aligned with said rod in end to end relation when in operating position, (c) adjacent ends of said nozzle being magnetically attractive to one another whereby said nozzle is detachably connected to said rod, (d) the opposing adjacent ends of said nozzle and rod being formed with opposing cooperating flat circular faces for magnetic mating face-to-face engagement, (e) a shoulder having an inclined inner annular surface formed about one of said faces, and, (f) a flexible tubular conduit having one end connected to said follower and the opposite end connected to said nozzle and in communication with the interior thereof for delivering air thereto.

References Cited
UNITED STATES PATENTS

| | | | |
|---|---|---|---|
| 2,500,850 | 3/1950 | Miller. | |
| 2,692,498 | 10/1954 | Knobel | 73—37.5 |
| 2,863,363 | 12/1958 | Schmid | 90—62 |
| 2,976,613 | 3/1961 | Shields | 33—23 |
| 3,194,055 | 7/1965 | Knobel | 73—37.5 |

LOUIS R. PRINCE, *Primary Examiner.*

WILLIAM A. HENRY II, J. RENJILIAN,
*Assistant Examiners.*